US012567581B2

(12) United States Patent
   Akyildiz

(10) Patent No.:    US 12,567,581 B2
(45) Date of Patent:        Mar. 3, 2026

(54) ENERGY STORAGE DEVICE AND METHOD OF MANUFACTURING THEREOF

(71) Applicant: POW-STOR INC., Boca Raton, FL (US)

(72) Inventor: Saban Akyildiz, Boca Raton, FL (US)

(73) Assignee: POW-STOR Inc., Boca Raton, FL (US)

( * ) Notice: Subject to any disclaimer, the term of this patent is extended or adjusted under 35 U.S.C. 154(b) by 0 days.

(21) Appl. No.: 18/512,924

(22) Filed: Nov. 17, 2023

(65) Prior Publication Data

US 2024/0097118 A1      Mar. 21, 2024

Related U.S. Application Data

(63) Continuation of application No. 18/267,655, filed as application No. PCT/US2023/010227 on Jan. 5, 2023.

(Continued)

(51) Int. Cl.
   H01M 4/04        (2006.01)
   H01M 4/36        (2006.01)
   (Continued)

(52) U.S. Cl.
   CPC ......... H01M 4/366 (2013.01); H01M 4/0404 (2013.01); H01M 4/0419 (2013.01);
   (Continued)

(58) Field of Classification Search
   CPC .. H01M 2300/0008; H01M 4/02; H01M 6/04; H01M 6/045; H01M 10/22; H01M 10/26;
        H01M 2300/0002; H01M 50/202; H01M 50/204; H01M 50/358; H01M 10/0585; H01M 50/124; H01M 50/126;
   (Continued)

(56) References Cited

U.S. PATENT DOCUMENTS

2013/0266858 A1*  10/2013  Inoue ..................... H01G 11/50
                                                              427/126.3
2018/0138554 A1*  5/2018  Mukherjee .......... H01M 10/054
   (Continued)

FOREIGN PATENT DOCUMENTS

CA          3043360 C   * 12/2020   ........ H01M 10/0427
CN       103787310          5/2014
   (Continued)

OTHER PUBLICATIONS

Kang; Flexible Pocket Composite Structure, Manufacturing Method Therefor, Electrode Including Same, and Energy Storage Device Including Electrode; Machine translation of WO 2020/040416 A1 obtained from WIPO IP Portal (Year: 2019).*

(Continued)

*Primary Examiner* — Allison Bourke
*Assistant Examiner* — Charlene Bermudez
(74) *Attorney, Agent, or Firm* — Dentons US LLP; Derek A Auito

(57)                ABSTRACT

An energy storage device comprising an electrode having a borophene layer, which includes borophene particles and an ionic liquid, the energy storage device providing high capacity, fast charging, light weight, and long shelf life, and a method of manufacturing the energy storage device.

10 Claims, 8 Drawing Sheets

Related U.S. Application Data

(60) Provisional application No. 63/297,160, filed on Jan. 6, 2022.

(51) Int. Cl.

| | |
|---|---|
| *H01M 4/58* | (2010.01) |
| *H01M 4/60* | (2006.01) |
| *H01M 4/66* | (2006.01) |
| *H01M 4/80* | (2006.01) |
| *H01M 10/04* | (2006.01) |
| *H01M 10/0563* | (2010.01) |
| *H01M 50/107* | (2021.01) |
| *H01M 50/119* | (2021.01) |
| *H01M 50/152* | (2021.01) |
| *H01M 50/159* | (2021.01) |
| *H01M 50/30* | (2021.01) |
| *H01M 50/414* | (2021.01) |
| *H01M 4/02* | (2006.01) |

(52) U.S. Cl.
CPC ............. *H01M 4/364* (2013.01); *H01M 4/58* (2013.01); *H01M 4/663* (2013.01); *H01M 4/80* (2013.01); *H01M 10/0431* (2013.01); *H01M 50/107* (2021.01); *H01M 50/119* (2021.01); *H01M 50/30* (2021.01); *H01M 50/414* (2021.01); *H01M 2004/021* (2013.01)

(58) Field of Classification Search
CPC ............. H01M 50/224; H01M 50/229; H01M 50/231; H01M 50/276; H01M 50/28; H01M 50/282; H01M 50/289; H01M 50/308; H01M 50/317; H01M 50/394; H01M 50/40; H01M 50/411; H01M 50/4295; H01M 50/449; H01M 50/457; H01M 50/474; H01M 50/483; H01M 50/109; H01M 2004/028; H01M 10/0427; H01M 50/153; H01M 50/486; H01M 4/0404

See application file for complete search history.

(56) References Cited

U.S. PATENT DOCUMENTS

| | | | |
|---|---|---|---|
| 2019/0292061 A1* | 9/2019 | Chopra | C30B 25/02 |
| 2020/0343531 A1 | 10/2020 | Collins et al. | |
| 2022/0416238 A1* | 12/2022 | Baek | H01M 4/525 |

FOREIGN PATENT DOCUMENTS

| | | | | |
|---|---|---|---|---|
| CN | 110136988 | 8/2019 | | |
| JP | 2010232574 | 10/2010 | | |
| JP | 2011146169 A * | 7/2011 | | |
| JP | 2021190184 | 12/2021 | | |
| KR | 20200022847 | 3/2020 | | |
| WO | WO-2020040416 A1 * | 2/2020 | | B82B 1/008 |

OTHER PUBLICATIONS

Sudo et al; "Solid Battery Stack"; Machine translation of JP 2011/146169 A obtained from ESpacenet Patent Translate (Year: 2010).*

Liu Jianhua et al., "Theoretical prediction of borophene monolayer as anode materials for high-performance lithium-ion batteries," Ionics, Kiel, DE, vol. 24, No. 6, Nov. 16, 2017, pp. 1603-1615.

Japanese Office Action of Application No. 2024-541081 dated Dec. 16, 2025 (11 pages).

H. Li, et al., "Scalable Production of Few-Layer Boron Sheets by Liquid-Phase Exfoliation and Their Superior Supercapacitive Performance," ACS Nano, USA, American Chemical Society, Feb. 27, 2018, vol. 12, No. 2, pp. 1262-1272 (11 pages).

H. Chand, et al., "Borophene and Boron-Based Nanosheets: Recent Advances in Synthesis Strategies and Applications in the Field of Environment and Energy," Advanced Materials Interfaces, Germany, Aug. 11, 2021, vol. 8, No. 15, 2100045 (31 pages).

* cited by examiner

ENERGY STORAGE DEVICE AND METHOD OF MANUFACTURING THEREOF

CROSS-REFERENCE TO RELATED APPLICATIONS

This application is a continuation application of U.S. patent application Ser. No. 18/267,655, filed on Jun. 15, 2023, which is a National Stage of PCT/US23/10227, filed on Jan. 5, 2023, which claims priority to claims priority of U.S. Provisional Application No. 63/297,160, filed on Jan. 6, 2022 under 35 U.S.C. § 119(e), the entire contents of all of which are hereby incorporated by reference.

BACKGROUND

As the eco-friendly energy source especially in the field of electric vehicles continues to proliferate, needs of high performance energy storage devices continue to increase. Currently lithium ion batteries are leading the market but need and desire for new energy storage devices or new materials for improved performance thereof continues to evolve. In particular, the recently developed electrode materials are the center of attention, as they are capable of providing high performance of energy storage devices in terms of high capacity, fast charging, fast output, durability, and etc.

Two-dimensional (2D) nano-structured materials such as graphene have been subjects of extensive scientific studies for a new electrode material candidates due to their unique properties. Most recently, borophene, a single layer of boron atoms that form various crystalline structures, has been attracting attention as a "super material" for its excellent electrical properties, and it can be applied in various fields including energy storage, microelectronics, and etc. In particular, borophene can be used as an electrode material in an energy storage device due to its high capacity and excellent conductivity.

SUMMARY

The present disclosure provides an energy storage device including a borophene-based electrode and a simplified method of manufacturing the same.

More specifically, the present disclosure is directed to an energy storage device comprising:

a positive connector;

a negative connector;

an electrode assembly including one or more electrodes between a first protective layer and a second protective layer; and a housing accommodating the electrode assembly, wherein the electrode includes a borophene layer and a substrate, the borophene layer comprising borophene particles and an ionic liquid, wherein the positive connector and the negative connector are attached to an outer surface of the housing.

Preferably, the ionic liquid may be aqueous phosphoric acid.

In one aspect of the present disclosure, the borophene particles may have a particle size in a range from 0.001 to 2 μm.

Preferably, the substrate may be a microporous vulcanized cellulose or an aluminum foil. More preferably, the substrate may be a microporous vulcanized cellulose.

In one aspect, each of the first protective layer and the second protective layer may be a plastic layer. The plastic layer may be formed of a plastic material comprising polyethylene, polypropylene, polyvinylchloride or nylon.

Preferably, the electrode assembly may include two or more electrodes and a third protective layer between the two or more electrodes.

Preferably, the electrode may include the borophene layer on both top and bottom surfaces of the substrate.

In one embodiment, the housing may be an aluminum housing.

In another embodiment, the housing may include one or more gas vents.

In still another embodiment, the housing may have any shape selected from cube, cuboid, coin, and cylindrical shape.

The present disclosure also provides a method of preparing an energy storage device, the method comprising:

applying borophene particles on a surface of a substrate;

spraying an ionic liquid on the borophene particles on the substrate to form a pre-coat layer;

spreading the pre-coat layer to form a borophene layer, thereby forming one or more electrodes;

laminating the one or more electrodes between a first protective layer and a second protective layer to form an electrode assembly;

enclosing the electrode assembly in a housing; and attaching a positive connector and a negative connector to an outer surface of the housing.

Preferably, the ionic liquid may be aqueous phosphoric acid.

In an embodiment, the borophene particles may have a particle size from 0.001 to 2 μm.

Preferably, the substrate may be a microporous vulcanized cellulose or an aluminum foil. More preferably, the substrate may be a microporous vulcanized cellulose.

Preferably, each of the first protective layer and the second protective layer may be a plastic layer.

The plastic layer may be formed of a plastic material comprising polyethylene, polypropylene, polyvinylchloride or nylon.

In one embodiment, the electrode assembly may include two or more electrodes and a third protective layer between the two or more electrodes.

In another embodiment, the borophene layer may be formed on both top and bottom surfaces of the substrate.

In one embodiment, the housing may be an aluminum housing.

In another embodiment, the housing may include one or more gas vents.

In still another embodiment, the housing may have any shape selected from cube, cuboid, coin, and cylindrical shape.

The present disclosure further provides an energy storage module comprising a plurality of the energy storage devices described above.

In another aspect of the present disclosure, there is also provided an energy storage pack comprising a plurality of the energy storage modules described above.

Other devices and methods according to embodiments of the present disclosure will be apparent to a person skilled in the art upon review of the following drawings and detailed description. It is intended that all such additional devices and methods be included within this description and within the scope of this disclosure.

DETAILED DESCRIPTION

The following detailed description is directed to an energy storage device including a borophene-based electrode and a method for manufacturing the same.

Figure 1:
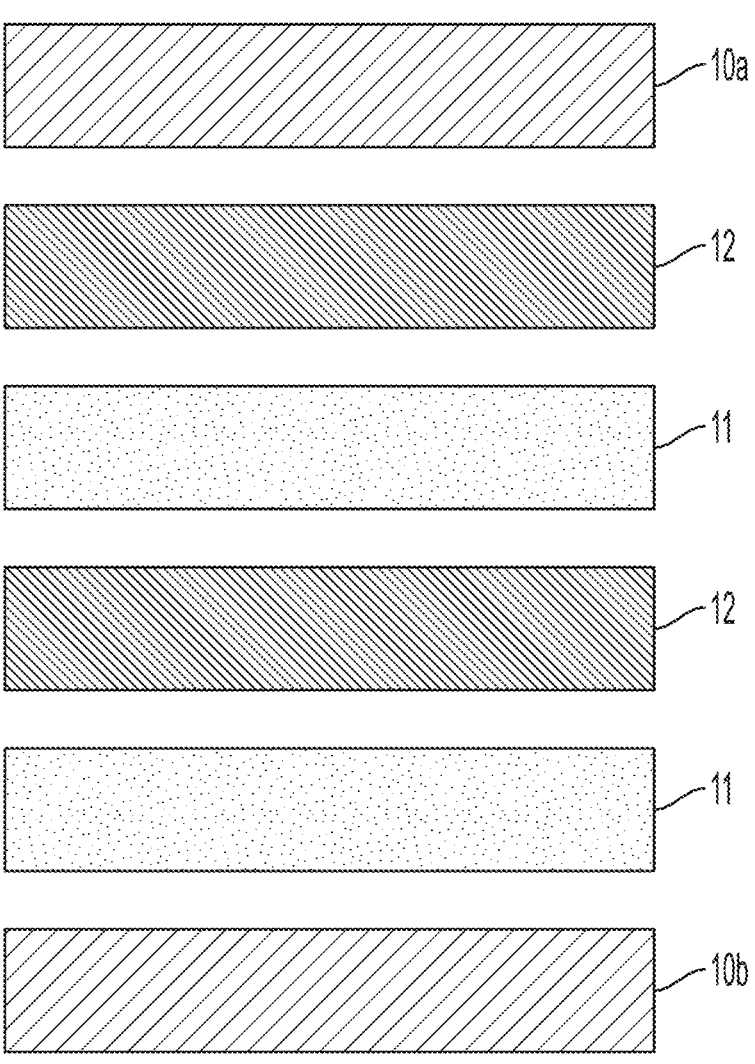
FIG. 1 is an illustration showing a structure of an electrode assembly of an energy storage device according to the first embodiment of the present disclosure.

FIG. 1 shows a structure of an electrode assembly of an energy storage device according to the first embodiment of the present disclosure.

Referring to FIG. 1, the electrode assembly includes a first protective layer 10*a* which is a plastic layer, an electrode including a borophene layer 12 coated on a substrate which is a microporous vulcanized cellulose or an aluminum foil, another electrode having another borophene layer 12 and another substrate 11, and a second protective layer 10*b*.

The borophene layer 12 is formed on the substrate 11, by applying borophene particles on the substrate, and spraying ionic liquid on the borophene particles.

Preferably, the electrode assembly of the energy storage device of the first embodiment is formed by rolling the above listed components in the above said sequence.

Figure 2A:
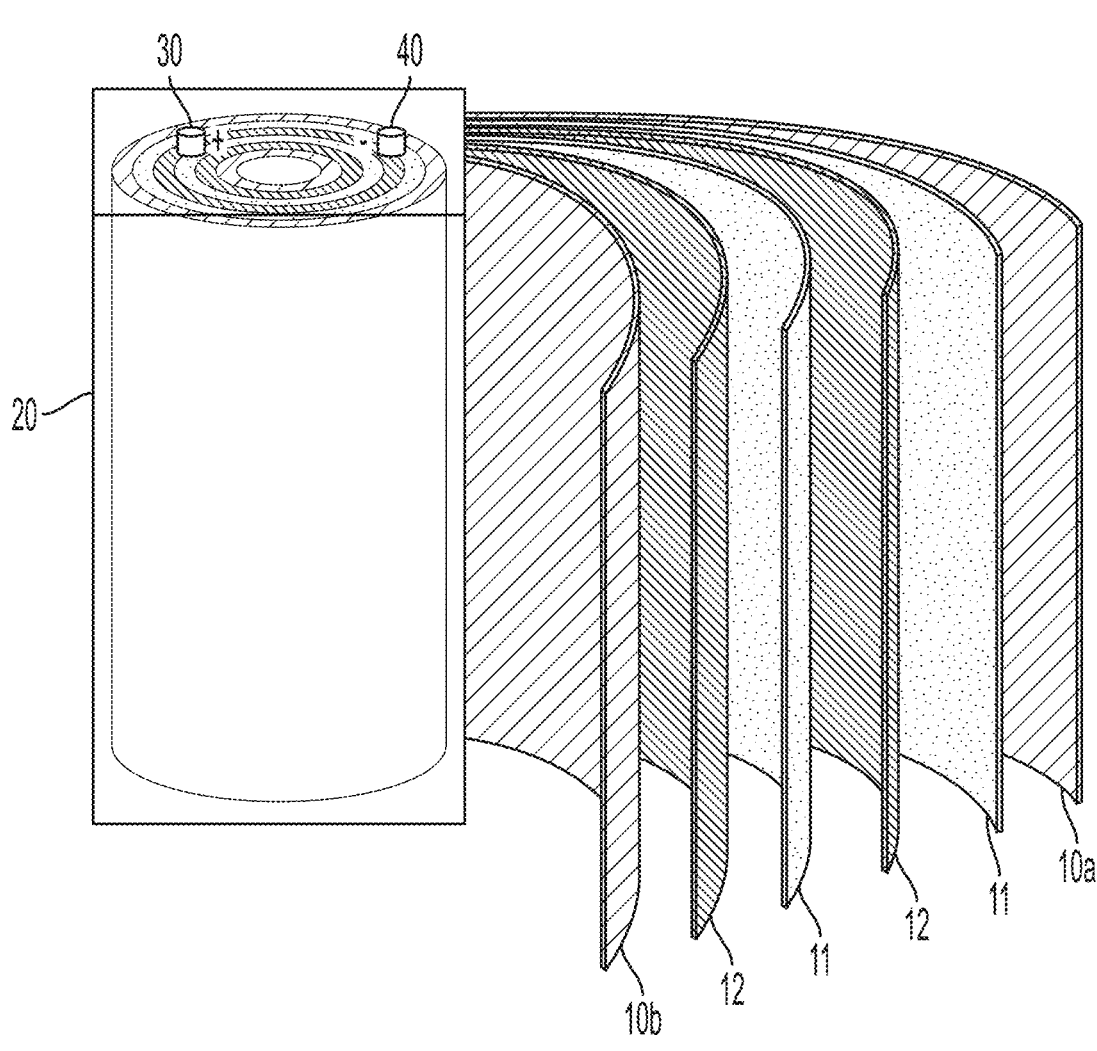
FIG. 2A is an illustration showing a structure of the energy storage device according to the first embodiment of the present disclosure.

FIG. 2A illustrates a structure of an energy storage device according to the first embodiment of the present disclosure.

Referring to FIG. 2A, a positive connecter 30 and a negative connector 40 are attached to the top surface of an aluminum housing 20. These positive connector and negative connector may be a screw type or have a hole, and may be connected to cables or to slide-in connectors.

Preferably, in the energy storage device of the first embodiment, the first plastic protective layer 10*a* covers the electrode, at the outer surface of the electrode assembly, including a substrate 11, for example a microporous vulcanized cellulose, and a borophene layer 12. The borophene layer is formed on the substrate 11, by applying borophene particles on the substrate 11, and spraying an ionic liquid, for example aqueous phosphoric acid, on the borophene particles.

The energy storage device of the first embodiment includes an additional electrode which includes the substrate and the borophene layer obtained by the same process as described above, and the second plastic protective layer adjacent thereto. When the device is a cylindrical shape and needs to be manufactured to have a smaller or larger diameter, the borophene layers may be removed or added depending on the desired size of the device. Similarly, the protective layers may be removed or added depending on the desired size of the device.

Figure 2B:
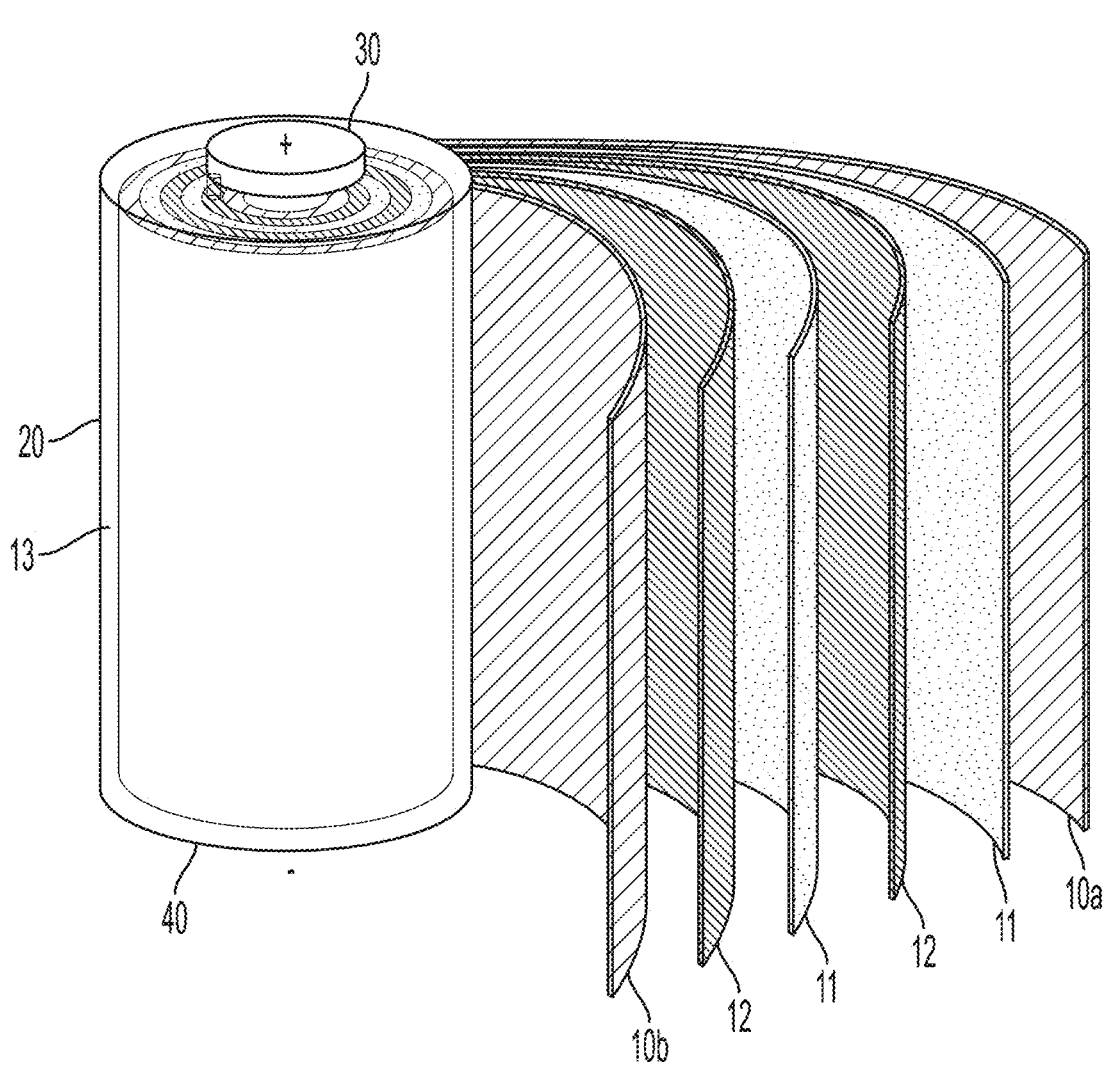
FIG. 2B is an illustration showing a structure of an energy storage device according to the second embodiment of the present disclosure.

FIG. 2B shows a structure of an energy storage device according to the second embodiment of the present disclosure.

Referring to FIG. 2B, the energy storage device of the second embodiment of the present disclosure is different from the first embodiment only that the negative connector and the positive connector are located at the opposite ends from each other. The electrode assembly including the plastic protective layer 10 and the electrode having the substrate 11 and the borophene layer 12, is included in the inner portion 13 of the aluminum housing 20.

Figure 3:
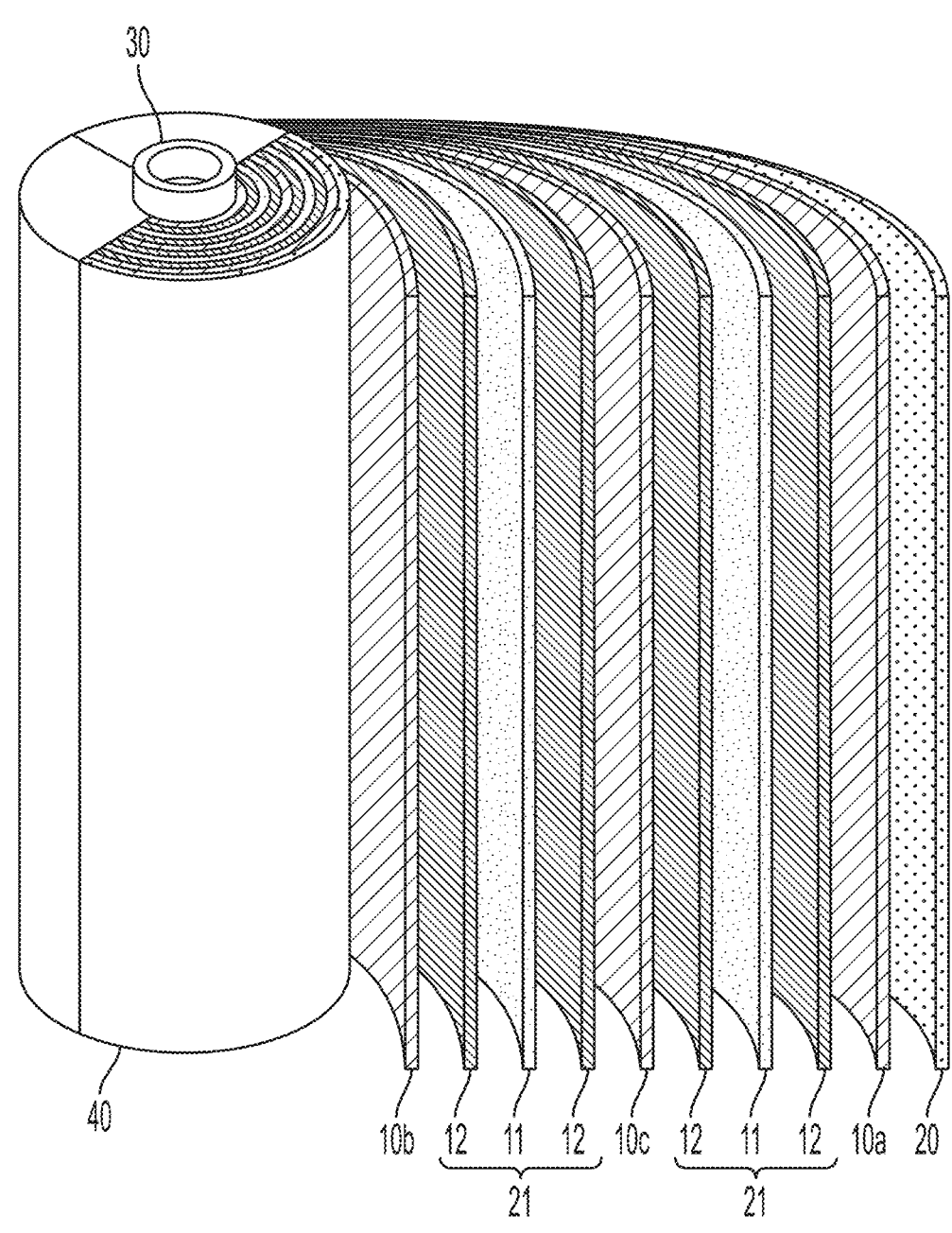
FIG. 3 is an illustration showing a structure of an energy storage device according to the third embodiment of the present disclosure.

FIG. 3 is an illustration showing a structure of an energy storage device according to the third embodiment of the present disclosure.

Referring to FIG. 3, the energy storage device of the third embodiment includes the first plastic protective layer 10*a*, two electrodes 21 including the borophene layer 12 on both top and bottom surfaces of the substrate 11, formed by the same process as described above, the third plastic protective layer 10*c* between the two electrodes 21 which may also function as a separator or a divider, and the second plastic protective layer 10*b* at the inner surface of the electrode assembly, enclosed in the aluminum housing 20 having a shape of a cylinder.

Figure 4A:
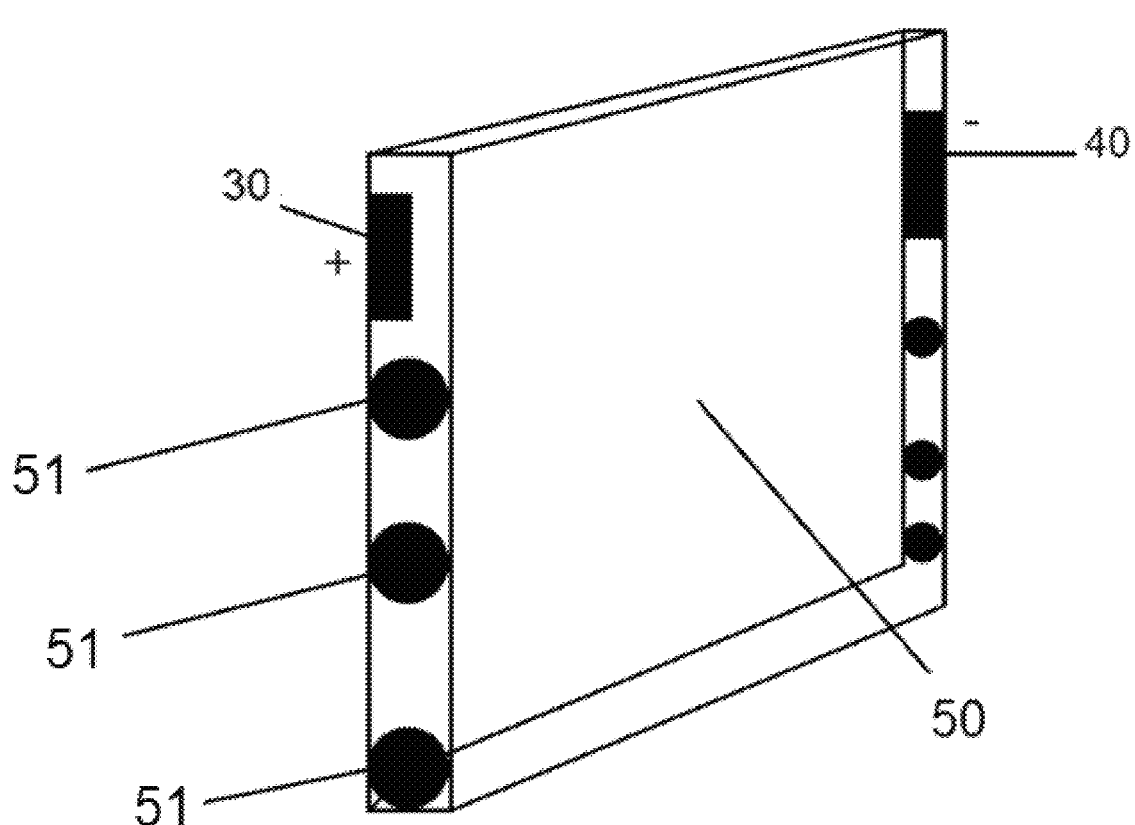
FIG. 4A is an illustration showing a structure of an energy storage device according to the fourth embodiment of the present disclosure.

FIG. 4A is an illustration showing a structure of an energy storage device according to the fourth embodiment of the present disclosure.

Referring to FIG. 4A, the energy storage device of the fourth embodiment includes an aluminum housing 50 having a cuboid shape and the positive connector 30 and the negative connector 40 are attached thereto. The aluminum housing 50 further includes gas vents 51 for ventilation.

Figure 4B:
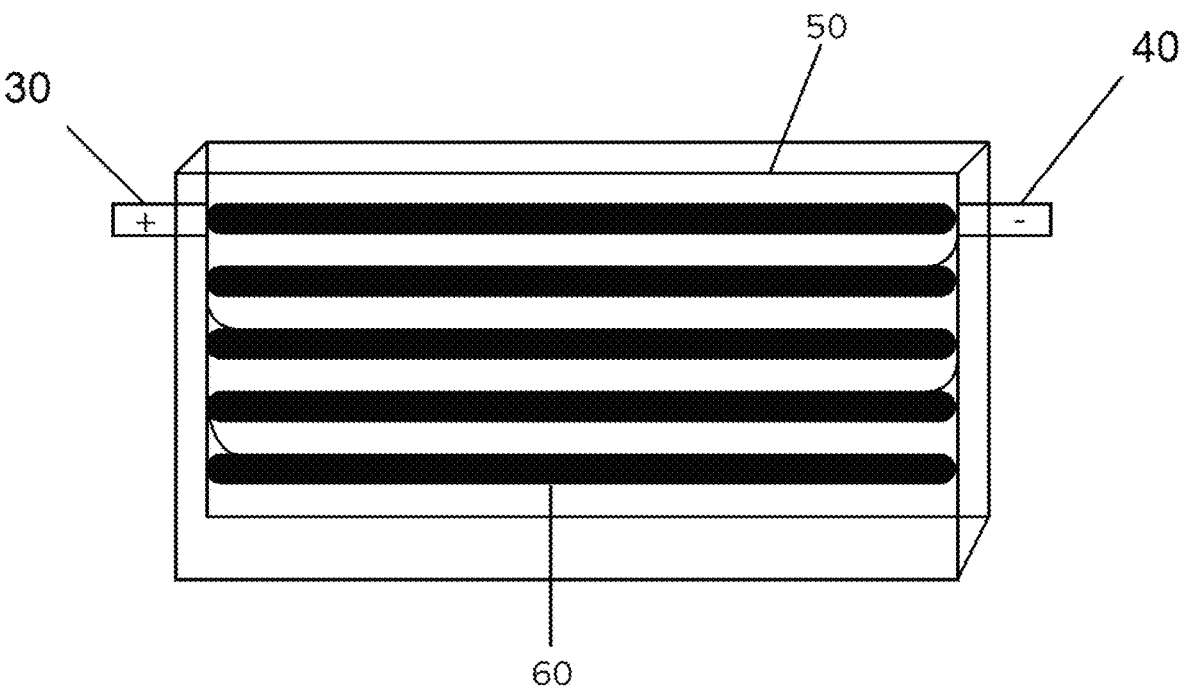
FIG. 4B is an illustration showing a structure of an energy storage device according to the fifth embodiment of the present disclosure.

FIG. 4B is an illustration showing a structure of an energy storage device according to the fifth embodiment of the present disclosure.

Referring to FIG. 4B, the energy storage device of the fifth embodiment includes the positive connector 30 and the negative connector 40 located at the opposite ends from each other and extended outwards from the aluminum housing 50, and each of the electrodes 60 including the borophene layer formed on the substrate, for example a microporous vulcanized cellulose, and the plastic protective layer is extended along the direction from the positive connector to the negative connector inside the housing 50.

Figure 5:
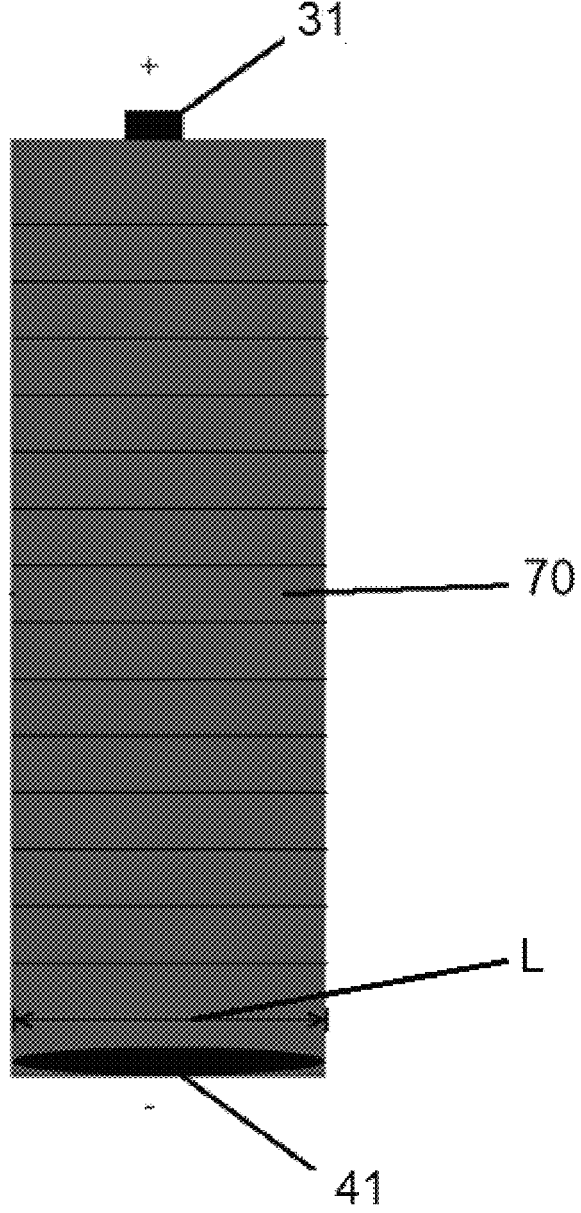
FIG. 5 is a plan view showing a structure of an energy storage module according to an embodiment of the present disclosure.

FIG. 5 is a plan view showing a structure of an energy storage module according to an embodiment of the present disclosure.

Referring to FIG. 5, the energy storage module of an embodiment of the present disclosure includes sixteen (16) individual energy storage devices 70 connected in series and the positive connecting end 31 and the negative connecting end 41 located at the opposite ends from each other.

The individual energy storage device 70 has a diameter of ¾ inch and a length L of 2¼ inch, and a voltage of 2.7 V. This relatively small sized module can have a voltage of 43.2 V.

Figure 6:
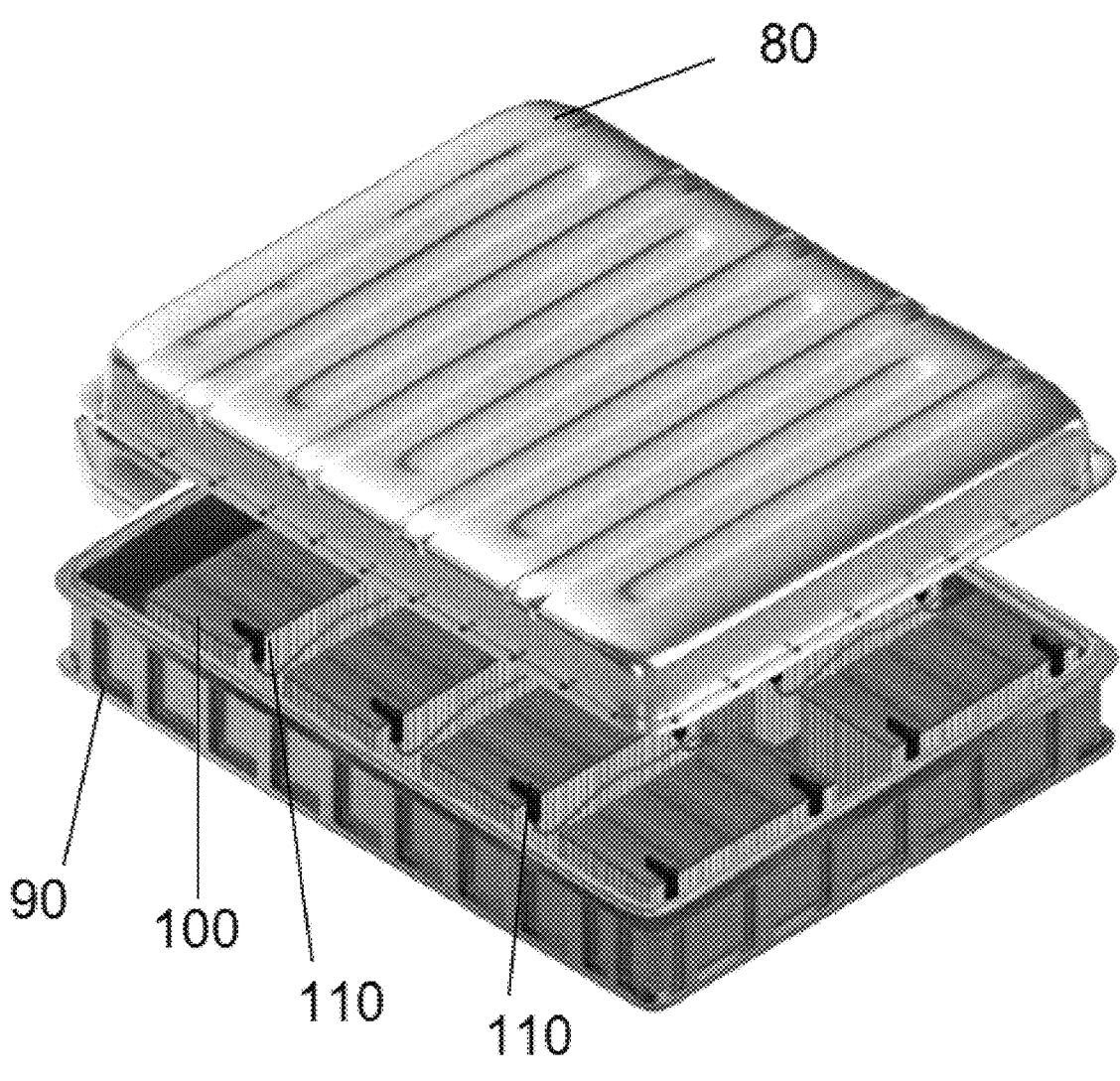
FIG. 6 is an illustration showing a structure of an energy storage pack according to an embodiment of the present disclosure.

FIG. 6 is an illustration showing a structure of an energy storage pack according to an embodiment of the present disclosure.

Referring to FIG. 6, the energy storage pack of an embodiment of the present disclosure includes top cover 80 and lower plastic base 90 accommodating a plurality of energy storage modules 100.

The top cover 80 may be manufactured using any material such as lightweight aluminum steel but not limited thereto. The energy storage pack also includes electric connectors 110 to connect the energy storage modules 100. The energy storage modules may have different shapes from each other and the energy storage pack configuration may be designed in accordance with the desired voltage or current.

Example

A cylindrical energy storage device having a dimension of ¾ inch and a length of 2¼ inch has been prepared as described above in the third embodiment of the present disclosure. Two electrodes have been prepared by forming the borophene layer by applying borophene particle having a particle size of 0.001 to 2 µm on both top and bottom surfaces of the microporous vulcanized cellulose (GC Electronics, 560 Fibroid Fish Paper), spraying aqueous phosphoric acid on the borophene particles to form a pre-coat layer, then brushing the pre-coat layer to spread over the surface of the microporous electrolyte film.

As shown in FIG. 3, the electrode assembly including the first plastic protective layer 10a, which is a plastic film, the electrode assembly prepared as above and including the third plastic protective layer 10c which is the same plastic film as the first protective layer between the two electrodes 21, and the second plastic protective layer 10b which is also the same plastic film as the first plastic film, has been prepared and enclosed in the aluminum housing 20 having a shape of a cylinder.

The energy storage device prepared as above provides high performance electrical voltage of 2.7 V.

As described above, the method of the present disclosure provides substantially simplified manufacturing process and the high performance energy storage device with 60% lighter weight than conventional batteries, no limited shelf time, expected lifetime of 70 to 80 years, the minimum rechargeable cycles from 45,000 to 50,000 cycles, 60% faster charging time than lithium ion batteries, and 60% higher capacity than lithium ion batteries.

Due to the above described unique properties, the energy storage device of the present disclosure may be used for various applications such as defense drones, ships, boats, planes, trains, robots, laser applications, motorcycles, electric vehicles, and power plants.

What I claim is:

1. An energy storage device comprising:
   a positive connector;
   a negative connector;
   an electrode assembly including one or more electrodes between a first protective layer and a second protective layer; and
   a housing accommodating the electrode assembly,
      wherein the one or more electrodes includes a borophene layer and a substrate, the borophene layer comprising a combination of borophene particles and an ionic liquid dispersed on a surface of the substrate,
      wherein the positive connector and the negative connector are attached to an outer surface of the housing, and
      wherein a particle size of the borophene particles is in a range from 0.001 to 2 µm.

2. The energy storage device of claim 1, wherein the ionic liquid is aqueous phosphoric acid.

3. The energy storage device of claim 1, wherein the substrate is a microporous vulcanized cellulose or an aluminum foil.

4. The energy storage device of claim 1, wherein each of the first and second protective layers is a plastic layer formed of a plastic material comprising polyethylene, polypropylene, polyvinylchloride or nylon.

5. The energy storage device of claim 1, wherein the electrode assembly includes two or more electrodes and a third protective layer between the two or more electrodes.

6. The energy storage device of claim 1, wherein the one or more electrodes includes the borophene layer on both top and bottom surfaces of the substrate.

7. The energy storage device of claim 1, wherein the battery housing is an aluminum housing.

8. The energy storage device of claim 1, wherein the battery housing includes one or more gas vents.

9. An energy storage module comprising a plurality of the energy storage devices according to claim 1.

10. An energy storage pack comprising a plurality of the energy storage modules according to claim 9.

* * * * *